United States Patent
Maekawa

(10) Patent No.: US 9,288,348 B2
(45) Date of Patent: Mar. 15, 2016

(54) COMMUNICATION APPARATUS THAT SELECTS DESTINATION FROM JOB HISTORY, COMMUNICATION METHOD, AND NON-TRANSITORY COMPUTER READABLE MEDIUM

(71) Applicant: FUJI XEROX CO., LTD., Minato-ku, Tokyo (JP)

(72) Inventor: Takao Maekawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/202,848

(22) Filed: Mar. 10, 2014

(65) Prior Publication Data

US 2015/0015921 A1 Jan. 15, 2015

(30) Foreign Application Priority Data

Jul. 11, 2013 (JP) ................................. 2013-145869

(51) Int. Cl.
| | | |
|---|---|---|
| *H04N 1/00* | (2006.01) | |
| *H04N 1/32* | (2006.01) | |
| *H04N 1/44* | (2006.01) | |

(52) U.S. Cl.
CPC ....... *H04N 1/00482* (2013.01); *H04N 1/32106* (2013.01); *H04N 1/4413* (2013.01); *H04N 2201/0094* (2013.01); *H04N 2201/3202* (2013.01); *H04N 2201/328* (2013.01); *H04N 2201/3273* (2013.01); *H04N 2201/3274* (2013.01)

(58) Field of Classification Search
CPC .......... H04N 1/00482; H04N 1/32101; H04N 1/4413; H04N 2201/3202; H04N 2201/3274
USPC ................................. 358/1.9, 1.15, 1.16, 405
See application file for complete search history.

(56) References Cited

U.S. PATENT DOCUMENTS

| | | | | |
|---|---|---|---|---|
| 2009/0187758 A1* | 7/2009 | Fujii | ..................... | G06F 21/608 713/153 |
| 2011/0267649 A1* | 11/2011 | Akimoto | ................. | H04L 12/58 358/1.15 |
| 2013/0125234 A1* | 5/2013 | Nishiyama | ...................... | 726/21 |

FOREIGN PATENT DOCUMENTS

JP   2011-234170 A   11/2011

* cited by examiner

*Primary Examiner* — Jamares Q Washington
(74) *Attorney, Agent, or Firm* — Sughrue Mion, PLLC

(57) ABSTRACT

A communication apparatus includes an authentication unit, a retaining unit, an input unit, an extraction unit, a display, and a setting unit. The authentication unit authenticates a user. The retaining unit retains pieces of job history information each including information regarding a sender and at least one destination among an email address, a facsimile number, path information, and an address. To the input unit, an instruction for specifying a data destination from the pieces of job history information is inputted. The extraction unit extracts, in a case where the instruction has been inputted, pieces of job history information in each of which the authenticated user is indicated as either one of the sender and the destination. The display lists and displays all destinations included in the extracted pieces of job history information. The setting unit sets a destination selected from among the listed and displayed destinations, as the data destination.

9 Claims, 15 Drawing Sheets

FIG. 2

| | | |
|---|---|---|
| 1 | SUBJECT: QUALITY INSPECTION PROGRAM<br>DATE/TIME: 11/25/2012 13:30<br>SENDER: <SUGII> Sugii@xxxxx.co.jp | To: <SHIRAKAWA> Shirakawa@xxxxx.co.jp<br>To: <HOSHINO> Hoshino@xxxxx.co.jp<br>Cc: <SUGII> Sugii@xxxxx.co.jp<br>Fax: <QUALITY ASSURANCE DEPT> 030xxxxxxxx<br>Fax: <PRODUCT PLANNING DEPT> 045xxxxxxxx |
| 2 | SUBJECT: NEW DESIGN REVIEW MATERIAL<br>DATE/TIME: 11/30/2012 11:25<br>SENDER: <KURIHARA> Kurihara@xxxxx.co.jp | Fax: <DESIGN DEVELOPMENT DEPT> 045xxxxxxxx<br>Fax: <PRODUCT PLANNING DEPT> 045xxxxxxxx<br>Cc: <KURIHARA> Kurihara@xxxxx.co.jp<br>Cc: <TANIMOTO> Tanimoto@xxxxx.co.jp<br>Bcc: <SHIRAKAWA> Shirakawa@xxxxx.co.jp |
| 3 | SUBJECT: SUMMARY OF APPLICATIONS IN FIRST HALF YEAR<br>DATE/TIME: 12/01/2012 15:55<br>SENDER: <KAWABATA> Kawabata@xxxxx.co.jp | Fax: <INTELLECTUAL PROPERTY DEPT> 045xxxxxxxx<br>To: <HOSHINO> Hoshino@xxxxx.co.jp<br>Cc: <TAKESHITA> Takeshita@xxxxx.co.jp<br>Cc: <KAWABATA> Kawabata@xxxxx.co.jp |
| 4 | SUBJECT: PLACE OF YEAR-END PARTY<br>DATE/TIME: 12/10/2012 14:30<br>SENDER: <SHIRAKAWA> Shirakawa@xxxxx.co.jp | To: <HOSHINO> Hoshino@xxxxx.co.jp<br>To: <KANEKO> Kaneko@xxxxx.co.jp<br>To: <TANIMOTO> Tanimoto@xxxxx.co.jp<br>Cc: <SUGII> Sugii@xxxxx.co.jp<br>Cc: <SHIRAKAWA> Shirakawa@xxxxx.co.jp<br>Bcc: <HIRANO> Hirano@xxxxx.co.jp<br>Bcc: <KAWABATA> Kawabata@xxxxx.co.jp |
| 5 | SUBJECT: OUTLINE SPECIFICATION OF INDIVIDUAL PROJECT OF COMPANY N<br>DATE/TIME: 12/12/2012 20:45<br>SENDER: <SHIRAKAWA> Shirakawa@xxxxx.co.jp | Fax: <PRODUCT PLANNING DEPT> 045xxxxxxxx<br>Fax: <DESIGN DEVELOPMENT DEPT> 045xxxxxxxx<br>To: <SUGII> Sugii@xxxxx.co.jp<br>To: <TAKESHITA> Takeshita@xxxxx.co.jp<br>Cc: <KURIHARA> Kurihara@xxxxx.co.jp<br>Cc: <HIRANO> Hirano@xxxxx.co.jp<br>Cc: <KAWABATA> Kawabata@xxxxx.co.jp |

FIG. 5

| SELECT FROM RELATING TRANSMISSION HISTORY | | DESTINATION CONFIRMATION 0 | USER: Shirakawa |
|---|---|---|---|
| | | | CLOSE |

| SUBJECT | DATE/TIME | DESTINATION |
|---|---|---|
| QUALITY INSPECTION PROGRAM | 11/25/2012 13:30 | To: <SHIRAKAWA> Shirakawa@xxxxx.co.jp |
| NEW DESIGN REVIEW MATERIAL | 11/30/2012 11:25 | Fax: <DESIGN DEVELOPMENT DEPT> 045xxxxxxx |
| PLACE OF YEAR-END PARTY | 12/10/2012 14:30 | To: <HOSHINO> Hoshino@xxxxx.co.jp |
| OUTLINE SPECIFICATION OF INDIVIDUAL PROJECT OF COMPANY N | 12/12/2012 20:45 | Fax: <PRODUCT PLANNING DEPT> 045xxxxxxx |

FIG. 9

SELECT FROM RELATING TRANSMISSION HISTORY | DESTINATION CONFIRMATION 0 | USER: Shirakawa
CLOSE

| SUBJECT | DATE/TIME | DESTINATION |
|---|---|---|
| QUALITY INSPECTION PROGRAM | 11/25/2012 13:30 | To: <HOSHINO> Hoshino@xxxxx.co.jp |
| QUALITY INSPECTION PROGRAM | 11/25/2012 13:30 | Cc: <SUGII> Sugii@xxxxx.co.jp |
| QUALITY INSPECTION PROGRAM | 11/25/2012 13:30 | Fax: <QUALITY ASSURANCE DEPT> 030xxxxxxx |
| QUALITY INSPECTION PROGRAM | 11/25/2012 13:30 | Fax: <PRODUCT PLANNING DEPT> 045xxxxxxx |
| NEW DESIGN REVIEW MATERIAL | 11/30/2012 11:25 | Fax: <DESIGN DEVELOPMENT DEPT> 045xxxxxxx |
| NEW DESIGN REVIEW MATERIAL | 11/30/2012 11:25 | Fax: <PRODUCT PLANNING DEPT> 045xxxxxxx |

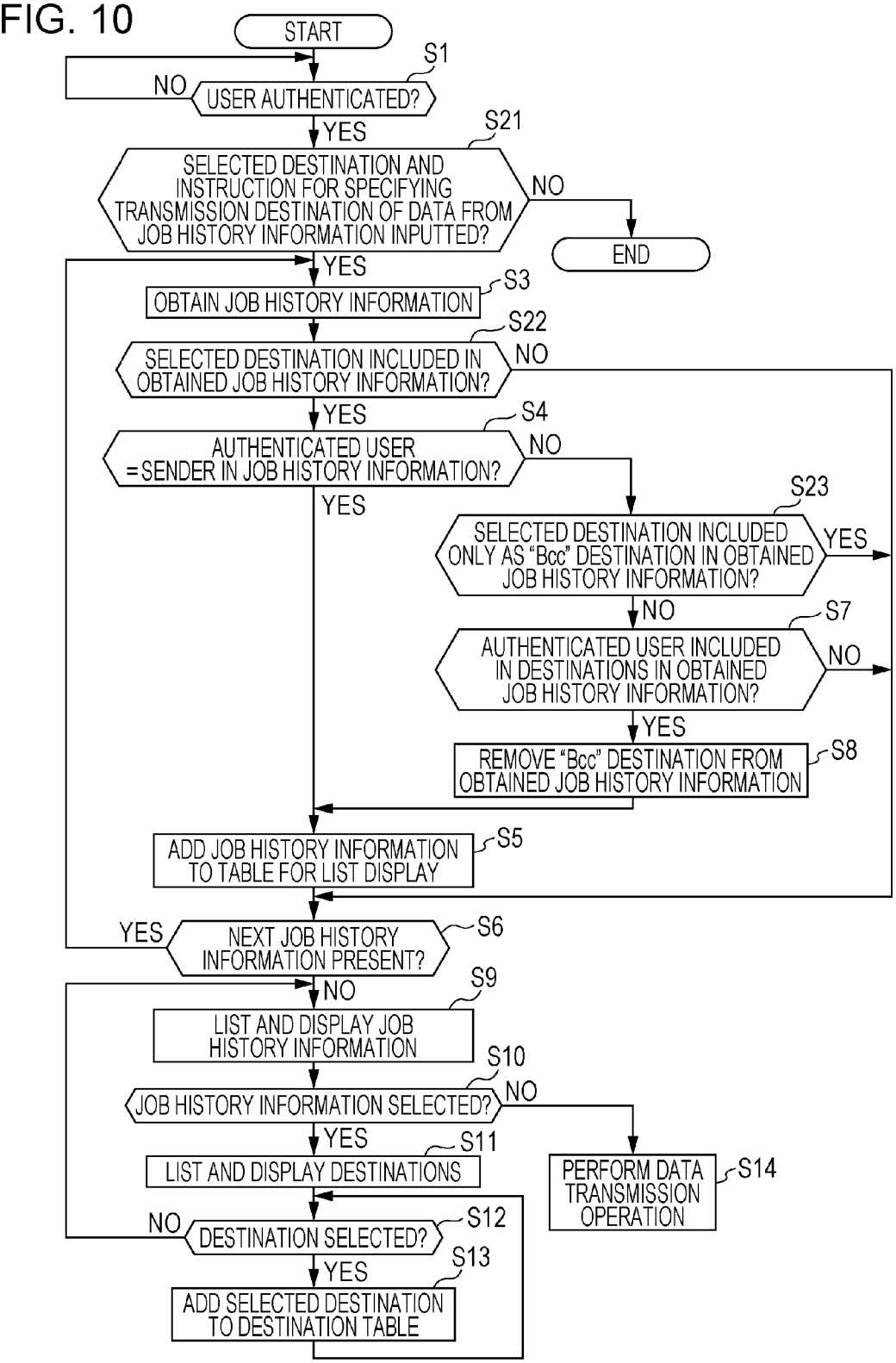

FIG. 11A

BASE UNIT DESTINATION LIST ▽ | DESTINATION CONFIRMATION 0 | USER: Kurihara
--- | --- | ---
| | CLOSE

☐ EMAIL
☐ FAX
☐ PC (FTP/SMB)

| DESTINATION NAME | EMAIL ADDRESS |
| --- | --- |
| IWAMOTO | Iwamoto@xxxxx.co.jp |
| KANEKO | Kaneko@xxxxx.co.jp |
| KAWABATA | Kawabata@xxxxx.co.jp |
| KURIHARA | Kurihara@xxxxx.co.jp |
| SHIRAKAWA | Shirakawa@xxxxx.co.jp |
| SUGII | Sugii@xxxxx.co.jp |

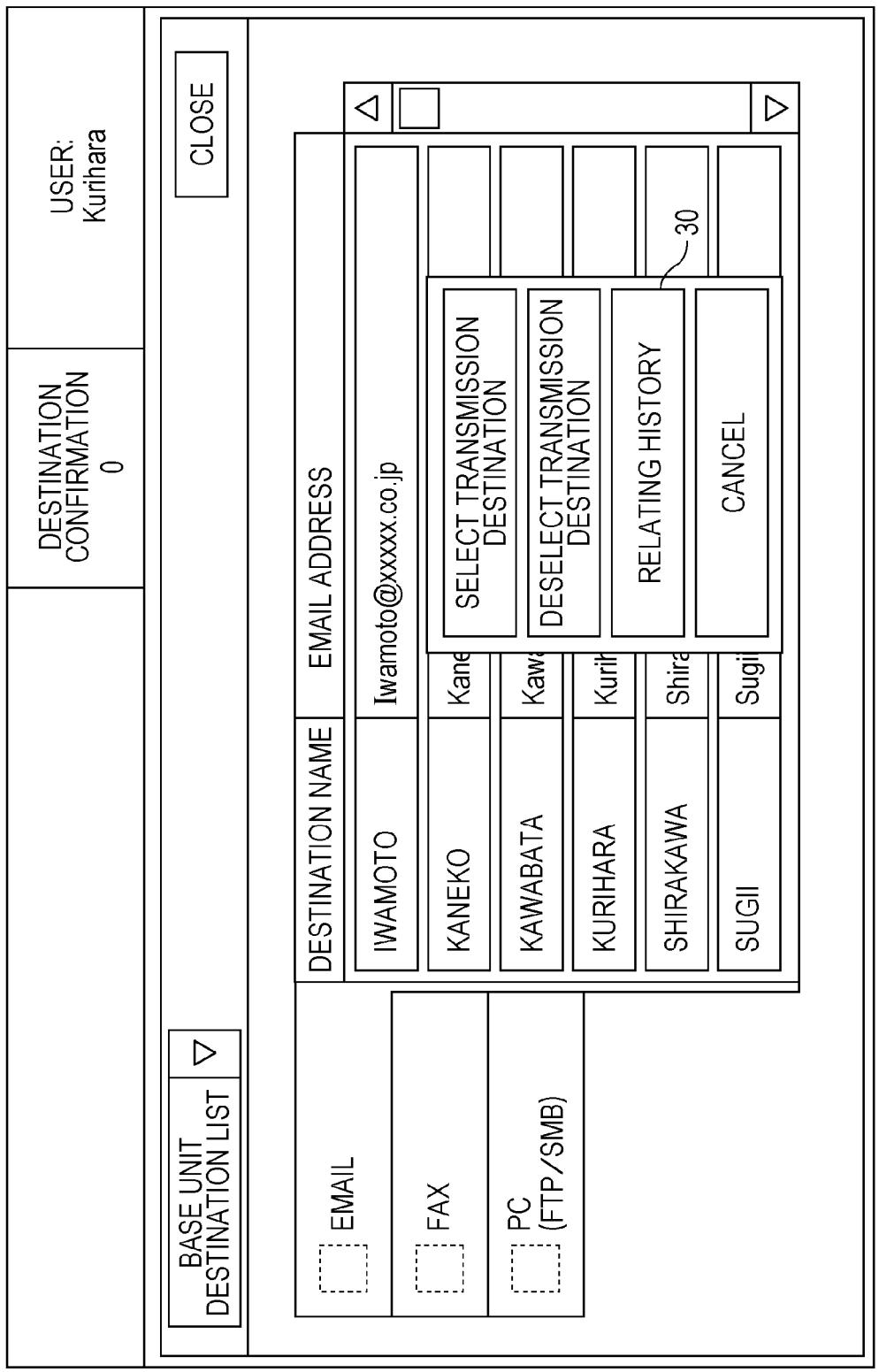

FIG. 12

| SELECT FROM RELATING TRANSMISSION HISTORY | | | DESTINATION CONFIRMATION 0 | USER: Kurihara |
|---|---|---|---|---|
| | | | CLOSE | |
| SUBJECT | DATE/TIME | DESTINATION | | |
| NEW DESIGN REVIEW MATERIAL | 11/30/2012 11:25 | Fax: <DESIGN DEVELOPMENT DEPT> 045xxxxxxx ... | | |
| OUTLINE SPECIFICATION OF INDIVIDUAL PROJECT OF COMPANY N | 12/12/2012 20:45 | Fax: <PRODUCT PLANNING DEPT> 045xxxxxxx ... | | |

FIG. 14

| SELECT FROM RELATING TRANSMISSION HISTORY | | DESTINATION CONFIRMATION 0 | USER: Kurihara |
|---|---|---|---|
| | | | CLOSE |

| SUBJECT | DATE/TIME | DESTINATION |
|---|---|---|
| NEW DESIGN REVIEW MATERIAL | 11/30/2012 11:25 | Fax: <DESIGN DEVELOPMENT DEPT> 045xxxxxxx |
| NEW DESIGN REVIEW MATERIAL | 11/30/2012 11:25 | Fax: <PRODUCT PLANNING DEPT> 045xxxxxxx |
| NEW DESIGN REVIEW MATERIAL | 11/30/2012 11:25 | Cc: <KURIHARA> Kurihara@xxxxx.co.jp |
| NEW DESIGN REVIEW MATERIAL | 11/30/2012 11:25 | Cc: <TANIMOTO> Tanimoto@xxxxx.co.jp |
| NEW DESIGN REVIEW MATERIAL | 11/30/2012 11:25 | Bcc: <SHIRAKAWA> Shirakawa@xxxxx.co.jp |
| OUTLINE SPECIFICATION OF INDIVIDUAL PROJECT OF COMPANY N | 12/12/2012 20:45 | Fax: <PRODUCT PLANNING DEPT> 045xxxxxxx |

COMMUNICATION APPARATUS THAT SELECTS DESTINATION FROM JOB HISTORY, COMMUNICATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-145869 filed Jul. 11, 2013.

BACKGROUND (i) Technical Field

The present invention relates to a communication apparatus, a communication method, and a non-transitory computer readable medium.

(ii) Related Art

An image forming apparatus has been widely available in which, when an electronic document is to be transmitted by facsimile or email, a destination is specified by using a virtual keyboard or a destination list registered in advance. Furthermore, an image forming apparatus has been available which has a function of registering a destination list for an individual user or a function of registering plural destinations together as a group. In such an image forming apparatus, a user registers in advance a desired destination or a desired group.

SUMMARY

According to an aspect of the invention, there is provided a communication apparatus including an authentication unit, a retaining unit, an input unit, an extraction unit, a display, and a setting unit. The authentication unit authenticates a user. The retaining unit retains one or more pieces of job history information, each of the one or more pieces of job history information being retained for each job, each of the one or more pieces of job history information including information regarding a sender of a past job and at least one destination among destinations including a "To", "Cc", or "Bcc" email address, a "Fax" facsimile number, path information indicating a folder in a storage, path information indicating a folder in an external apparatus, and an address indicating the external apparatus. To the input unit, an instruction for specifying a destination of data from the one or more pieces of job history information is inputted. The extraction unit extracts, in a case where the instruction for specifying a destination of data from the one or more pieces of job history information has been inputted, one or more pieces of job history information in each of which the user authenticated by the authentication unit is indicated as either one of the sender and the destination. The display lists and displays all destinations included in the one or more pieces of job history information that have been extracted. The setting unit sets a destination that has been selected by the user from among the destinations that have been listed and displayed, as the destination of data.

BRIEF DESCRIPTION OF THE DRAWINGS

Exemplary embodiments of the present invention will be described in detail based on the following figures, wherein:

FIG. 2 is a diagram illustrating an example of pieces of job history information;

FIG. 5 is a diagram illustrating an example of pieces of job history information listed and displayed in step S9 of FIG. 3;

FIG. 9 is a diagram illustrating an example in which destinations included in pieces of job history information that have been added to a table for list display are listed and displayed on the operation display;

FIG. 10 is a flowchart illustrating a second modification of processing of setting one or more destinations of data by using one or more pieces of job history information;

FIG. 11A is a diagram illustrating an example of a destination list displayed on the operation display and FIG. 11B is a diagram illustrating a state of the operation display in which one destination has been selected from the destination list;

FIG. 12 is a diagram illustrating an example of pieces of job history information listed and displayed in step S9 of FIG. 10;

FIG. 14 is a diagram illustrating an example in which destinations included in pieces of job history information that have been added to a table for list display are listed and displayed on the operation display.

DETAILED DESCRIPTION

Exemplary embodiments of the present invention will be described below with reference to the figures.

Figure 1:
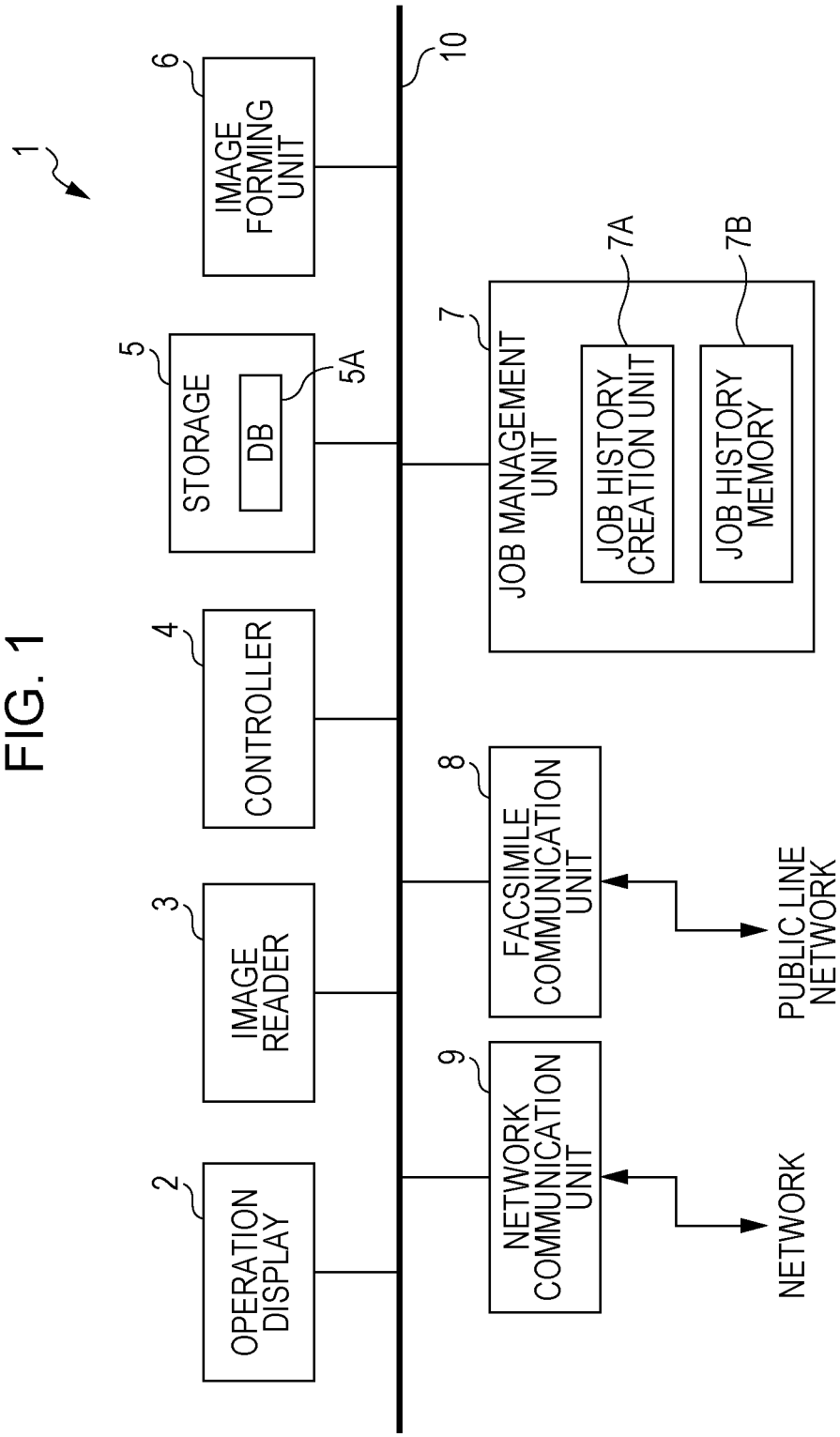
FIG. 1 is a block diagram schematically illustrating a configuration of a communication apparatus according to an exemplary embodiment.

FIG. 1 is a block diagram schematically illustrating a configuration of a communication apparatus according to an exemplary embodiment.

A communication apparatus 1 in FIG. 1 is an image forming apparatus, such as a copier, a multifunction machine, or a printer. However, the communication apparatus 1 is not limited to an image forming apparatus and may be a computer, a portable terminal, or a tablet personal computer (PC).

The communication apparatus 1 includes an operation display 2, an image reader 3, a controller 4, a storage 5, an image forming unit 6, a job management unit 7, a facsimile communication unit 8, and a network communication unit 9. The controller 4 is connected to the operation display 2, the image reader 3, the storage 5, the image forming unit 6, the job management unit 7, the facsimile communication unit 8, and the network communication unit 9 via a bus 10.

The operation display 2 is formed of a liquid crystal display that includes a touch panel, for example. An operation screen is displayed on the operation display 2 and an operation instruction is inputted to the operation display 2. For example, a user selects a piece of job history information, which will be described below, a destination of data, or the like via the operation display 2. The operation display 2 functions as an input unit and a display.

The image reader 3 is a scanner and reads an image of a document placed on a document holder. The controller 4 is formed of a central processing unit (CPU) and a memory and controls operations of the entire apparatus. The controller 4 functions as an authentication unit, an extraction unit, a setting unit, and a removing unit.

The storage 5 is formed of a hard disk drive (HDD) or the like and stores a control program of the communication apparatus 1 and image data read by the image reader 3. The storage 5 has database 5A for user authentication. The storage 5 functions as a retaining unit.

The controller 4 performs user authentication on the basis of a user identifier (ID) and a password inputted to the operation display 2 and the database 5A for user authentication. If a user ID and a password inputted to the operation display 2 correspond to a user ID and a password registered in the database 5A for user authentication, access will be granted to the user of the user ID that has been inputted to the operation display 2. In other words, the user is allowed to use the communication apparatus 1. Note that a user ID is associated with an email address of the user or a user ID may be an email address of the user.

The image forming unit 6 is a mechanism for actually performing printing and includes a photoconductor, a charger, a transfer unit, and a fixing unit, for example. The job management unit 7 is formed of a CPU and a memory and includes a job history creation unit 7A that creates pieces of job history information and a job history memory 7B that stores pieces of job history information. As illustrated in FIG. 2, a piece of job history information created for each job includes information regarding a subject, date/time, a sender, and one or more destinations ("To", "Cc", "Bcc", "Fax", a path indicating a folder in the storage 5, a path indicating an external server or an external storage, or an Internet Protocol (IP) address indicating an external server or an external storage). As described above, a destination is not limited to an email address, a phone number, or a facsimile number and may be path information or an IP address that indicates a destination. Although not illustrated in FIG. 2, in a piece of job history information for a job, data that has been transmitted in the job may also be stored. The job history creation unit 7A receives information regarding a subject, a sender, and one or more destinations from the operation display 2 and creates a piece of job history information on the basis of the received information and date/time of the reception. The job history memory 7B stores a piece of job history information that has been created.

The facsimile communication unit 8 is connected to a public line network and is used when data is transmitted or received by facsimile. The network communication unit 9 is connected to a network and is used when data is transmitted or received by email.

Figure 3:
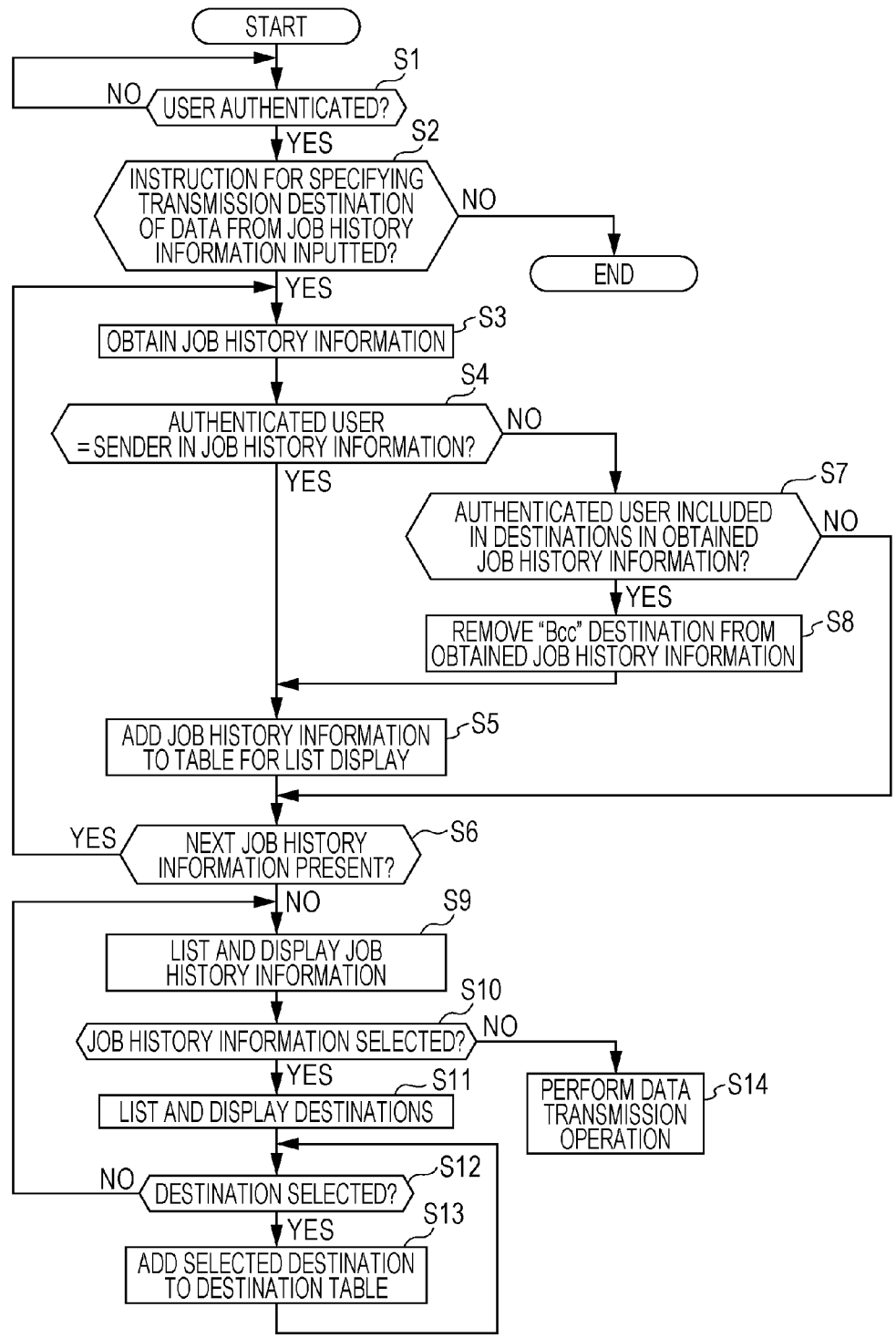
FIG. 3 is a flowchart illustrating processing of setting one or more destinations of data by using one or more pieces of job history information.

FIG. 3 is a flowchart illustrating processing of setting one or more destinations of data by using one or more pieces of job history information.

First, the controller 4 determines whether or not a user ID and a password inputted to the operation display 2 have been authenticated (step S1). If a user ID and a password inputted to the operation display 2 have not been authenticated (NO in step S1), the determination is repeated. On the other hand, if a user ID and a password inputted to the operation display 2 have been authenticated (YES in step S1), the controller 4 determines whether or not an instruction for specifying a transmission destination of data from one or more pieces of job history information has been inputted (step S2). More specifically, the controller 4 determines whether or not a button 21 in a screen used to specify a transmission destination illustrated in FIG. 4, the screen being displayed on the operation display 2, has been pressed. Note that, in the example of FIG. 4, an authenticated user is "Shirakawa".

If an instruction for specifying a transmission destination of data from one or more pieces of job history information has not been inputted (NO in step S2), the processing ends. On the other hand, if an instruction for specifying a transmission destination of data from one or more pieces of job history information has been inputted (YES in step S2), the controller 4 obtains a piece of job history information from the job history memory 7B (step S3).

The controller 4 determines whether or not the authenticated user is a sender indicated in the piece of job history information that has been obtained (step S4). As described above, a user ID is associated with an email address of the user and therefore the controller 4 is able to perform the determination in step S4.

If the authenticated user is a sender indicated in the piece of job history information that has been obtained (YES in step S4), the controller 4 adds the piece of job history information to a table for list display (step S5). Here, a table for list display is stored in the job history memory 7B or in the storage 5 and is read as appropriate by the controller 4.

Next, the controller 4 determines whether or not the next piece of job history information is present in the job history memory 7B (step S6). If the next piece of job history information is present in the job history memory 7B (YES in step S6), the procedure returns to step S3.

If the authenticated user is not a sender indicated in the piece of job history information that has been obtained (NO in step S4), the controller 4 determines whether or not the authenticated user is included in one or more destinations (in other words, in the field of "Fax", "To", "Cc", or "Bcc") indicated in the piece of job history information that has been obtained (step S7). If the authenticated user is not included in one or more destinations indicated in the piece of job history information that has been obtained (NO in step S7), the procedure proceeds to step S6. On the other hand, if the authenticated user is included in one or more destinations indicated in the piece of job history information that has been obtained (YES in step S7), the controller 4 removes a "Bcc" destination from the piece of job history information that has been obtained (step S8) and the procedure proceeds to step S5. This processing is performed because, if a "Bcc" destination is not removed, a "Bcc" destination, a sender of the job desiring nondisclosure of the "Bcc" destination, will be disclosed to any recipient of the job and information security will be compromised. In other words, step S8 is performed in order for a "Bcc" destination not to be disclosed to the authenticated user who is merely one of the recipients of the job.

Next, if the next piece of job history information is not present in the job history memory 7B (NO in step S6), the controller 4 lists and displays one or more pieces of job history information that have been added to the table for list display, on the operation display 2 (step S9).

Figure 4:
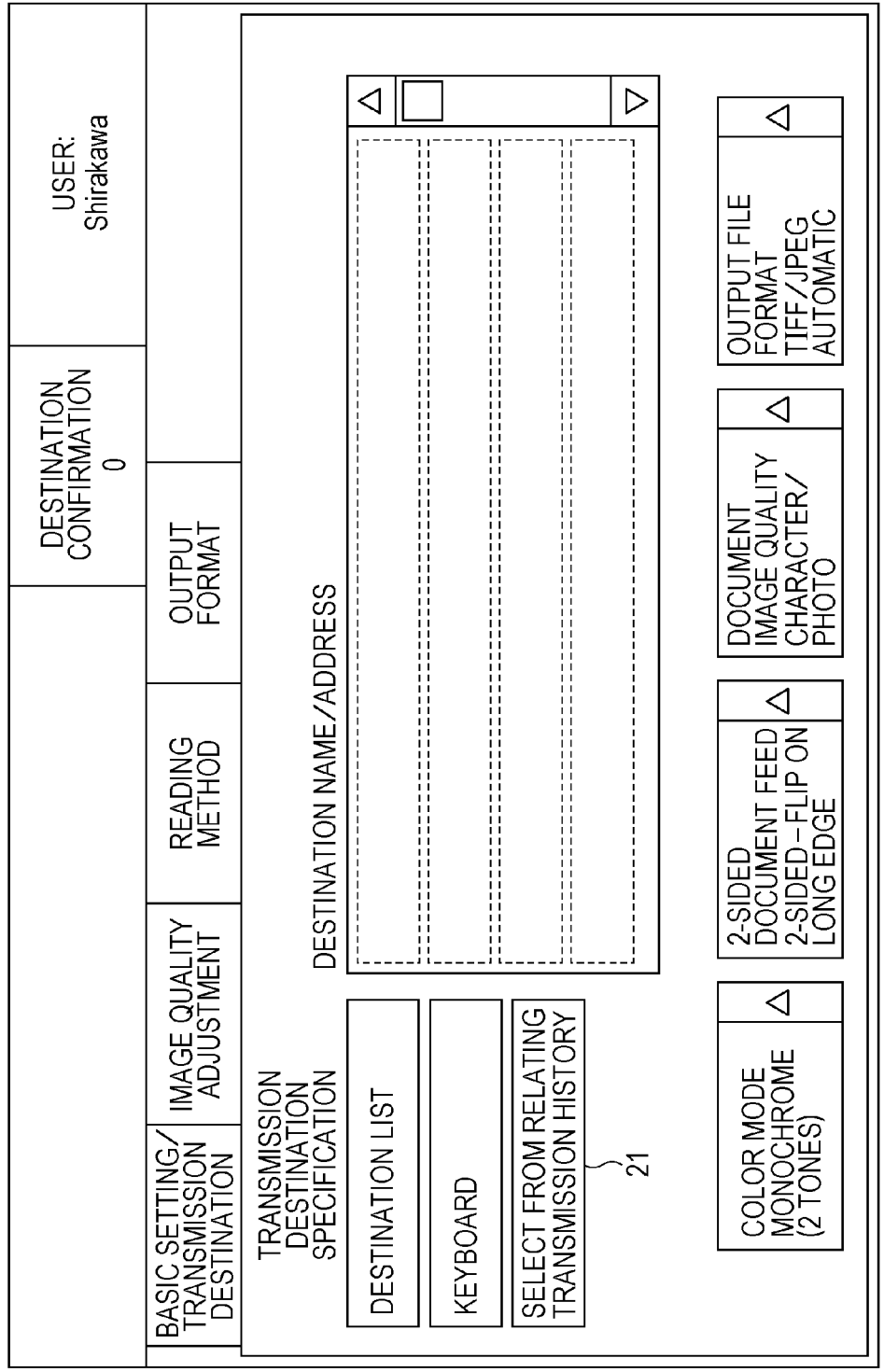
FIG. 4 is a diagram illustrating an example of a screen used to specify a transmission destination.

For example, it is assumed that an authenticated user is "Shirakawa" as illustrated in FIG. 4 and there are five pieces of job history information as illustrated in FIG. 2. In the first piece of job history information in FIG. 2, "Shirakawa" is included as a "To" destination and therefore the first piece of job history information is added to a table for list display. In the second piece of job history information in FIG. 2, "Shirakawa" is included as a "Bcc" destination and therefore the second piece of job history information is added to the table for list display. In this case, a "Bcc" destination other than "Shirakawa" is removed from the second job history information (see step S8). In the third piece of job history information in FIG. 2, "Shirakawa" is not included in the destinations and therefore the third piece of job history information is not added to the table for list display. In the fourth and fifth pieces of job history information in FIG. 2, "Shirakawa" is a sender indicated in these pieces of job history information and therefore the fourth and fifth pieces of job history information are added to the table for list display. Note that, in the case where an authenticated user is a sender indicated in a piece of job history information, a "Bcc" destination is not removed from the piece of job history information because a security issue does not arise in this case. FIG. 5 illustrates an example of pieces of job history information listed and displayed in step S9 of FIG. 3.

Figure 6:
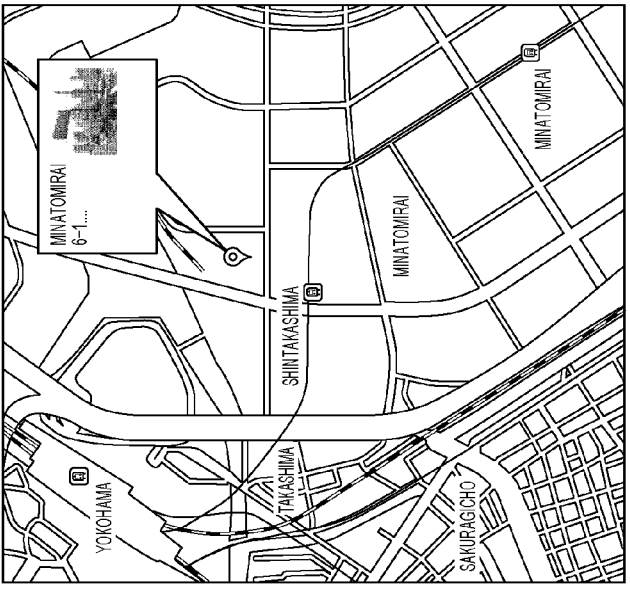
FIG. 6 is a diagram illustrating an example in which destinations included in one of the pieces of job history information illustrated in FIG. 5 are listed and displayed on an operation display.

Referring back to FIG. 3, the controller 4 determines whether or not a piece of job history information has been selected from among one or more pieces of job history information that have been listed and displayed (step S10). If a piece of job history information has been selected (YES in step S10), the controller 4 lists and displays one or more destinations included in the piece of job history information that has been selected, on the operation display 2 (step S11). More specifically, the controller 4 lists and displays "To", "Cc", "Bcc" and "Fax" destinations included in the piece of job history information that has been selected, on the operation display 2. FIG. 6 illustrates an example in which destinations included in one of the pieces of job history information illustrated in FIG. 5 (specifically, a piece of job history information regarding "place of year-end party") are listed and displayed on the operation display 2.

Figure 7:
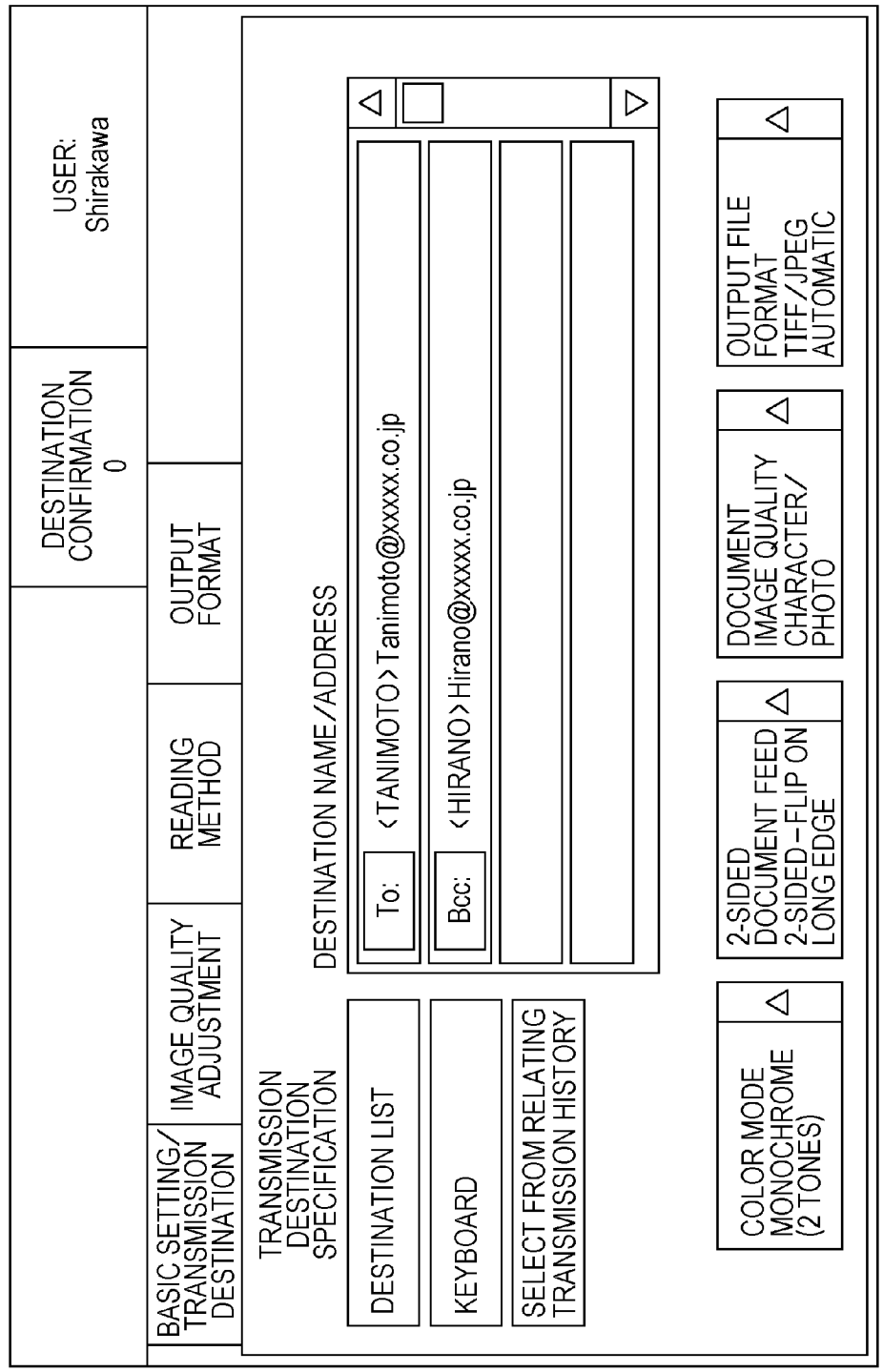
FIG. 7 is a diagram illustrating an example in which destinations that have been added to a destination table are displayed in a "Destination name/address" field in the screen used to specify a transmission destination.

Next, the controller 4 determines whether or not a destination has been selected from among one or more destinations that have been listed and displayed (step S12). If a destination has been selected from among one or more destinations that have been listed and displayed (YES in step S12), the controller 4 adds the destination that have been selected to a destination table (step S13) and the procedure returns to step S12. Here, a destination table is stored in the job history memory 7B or in the storage 5 and is read as appropriate by the controller 4. A destination added to a destination table is displayed in a "Destination name/address" field in the screen used to specify a transmission destination illustrated in FIG. 4, the screen being displayed on the operation display 2. FIG. 7 illustrates an example in which destinations that have been added to a destination table are displayed in the "Destination name/address" field in the screen used to specify a transmission destination. In the example of FIG. 7, "Tanimoto" and "Hirano" have been selected as destinations. Here, a destination displayed in the "Destination name/address" field may be modified. For example, "Hirano" in FIG. 7, which is a "Bcc" destination, may be modified so as to be a "Cc" destination.

If a destination has not been selected from among one or more destinations that have been listed and displayed (NO in step S12), the procedure returns to step S9. If a piece of job history information has not been selected from among one or more pieces of job history information that have been listed and displayed, in other words, if job history information selection has been completed (NO in step S10), a data transmission operation is performed (step S14).

In the processing illustrated in FIG. 3, only one or more pieces of job history information that relate to an authenticated user are listed and displayed, and one or more destinations included in a piece of job history information that has been selected from among one or more pieces of job history information that have been listed and displayed are listed and displayed. Accordingly, the number of destinations listed and displayed is reduced compared with a case where all destinations included in one or more pieces of job history information relating to an authenticated user are listed and displayed. As a result, a destination specification operation is facilitated.

Figure 8:
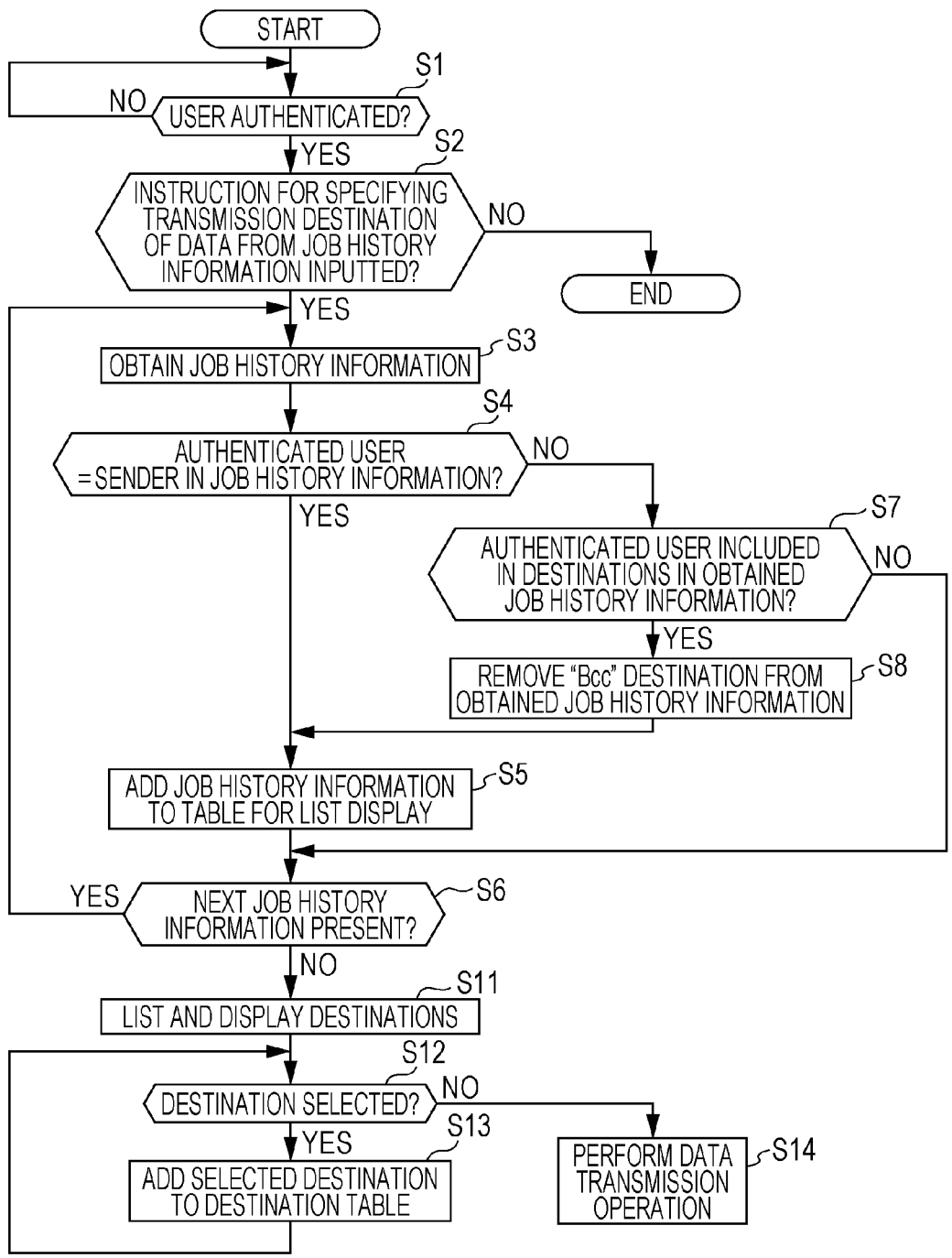
FIG. 8 is a flowchart illustrating a first modification of processing of setting one or more destinations of data by using one or more pieces of job history information.

FIG. 8 is a flowchart illustrating a first modification of processing of setting one or more destinations of data by using one or more pieces of job history information. In the flowchart illustrated in FIG. 8, steps S9 and S10 in FIG. 3 are omitted. In other words, in FIG. 8, the controller 4 does not list and display pieces of job history information that have been added to a table for list display but lists and displays one or more destinations included in pieces of job history information that have been added to a table for list display, on the operation display 2. Accordingly, with the processing illustrated in FIG. 8, processing time may be reduced compared with the processing illustrated in FIG. 3. FIG. 9 illustrates an example in which destinations included in pieces of job history information that have been added to a table for list display are listed and displayed on the operation display 2. In FIG. 8, if a destination has not been selected from among one or more destinations that have been listed and displayed, in other words, if destination selection has been completed (NO in step S12), a data transmission operation is performed (step S14).

FIG. 10 is a flowchart illustrating a second modification of processing of setting one or more destinations of data by using one or more pieces of job history information. Here, an authenticated user selects one destination and sets one or more destinations of data by using the selected destination and one or more pieces of job history information in each of which the authenticated user is indicated. A description will be given while focusing on processing different from the processing in FIG. 3.

First, the controller 4 determines whether or not a user ID and a password inputted to the operation display 2 have been authenticated (step S1). If a user ID and a password inputted to the operation display 2 have not been authenticated (NO in step S1), the determination is repeated. On the other hand, if a user ID and a password inputted to the operation display 2 have been authenticated (YES in step S1), the controller 4 determines whether or not a destination selected by a user has been inputted and an instruction for specifying a transmission destination of data from one or more pieces of job history information has been inputted (step S21). More specifically, the controller 4 determines whether or not one destination has been selected from a destination list illustrated in FIG. 11A, the destination list being displayed on the operation display 2, and a button 30 illustrated in FIG. 11B has been pressed, the button 30 being displayed on the operation display 2. A pop-up illustrated in FIG. 11B, which includes buttons of "Select transmission destination", "Deselect transmission destination", "Relating history", and "Cancel", is automatically displayed when one destination is selected from the destination list illustrated in FIG. 11A. Note that, in the example illustrated in FIGS. 11A and 11B, it is assumed that an authenticated user is "Kurihara" and a destination selected from the destination list is "Shirakawa".

If a destination selected by a user has not been inputted or an instruction for specifying a transmission destination of data from one or more pieces of job history information has not been inputted (NO in step S21), the processing ends. On the other hand, if a destination selected by a user has been inputted and an instruction for specifying a transmission destination of data from one or more pieces of job history information has been inputted (YES in step S21), the controller 4 obtains a piece of job history information from the job history memory 7B (step S3).

The controller 4 determines whether or not the destination that has been selected is included in the piece of job history information that has been obtained (step S22). If the destination that has been selected is not included in the piece of job history information that has been obtained (NO in step S22), the procedure proceeds to step S6. If the destination that has been selected is included in the piece of job history information that has been obtained (YES in step S22), the controller 4 determines whether or not the authenticated user is a sender indicated in the piece of job history information that has been obtained (step S4). As described above, a user ID is associated with an email address of the user and therefore the controller 4 is able to perform the determination in step S4.

If the authenticated user is a sender indicated in the piece of job history information that has been obtained (YES in step S4), the controller 4 adds the piece of job history information to a table for list display (step S5). Here, a table for list display is stored in the job history memory 7B or in the storage 5 and is read as appropriate by the controller 4.

Next, the controller 4 determines whether or not the next piece of job history information is present in the job history memory 7B (step S6). If the next piece of job history information is present in the job history memory 7B (YES in step S6), the procedure returns to step S3.

If the authenticated user is not a sender indicated in the piece of job history information that has been obtained (NO in step S4), the controller 4 determines whether or not the selected destination is included only as a "Bcc" destination, in the piece of job history information that has been obtained (step S23). If the selected destination is included only as a "Bcc" destination, in the piece of job history information that has been obtained (YES in step S23), the procedure proceeds to step S6. In other words, if the selected destination is included only as a "Bcc" destination, in the piece of job history information that has been obtained, the piece of job history information is not added to a table for list display. If this processing is not performed, a "Bcc" destination, a sender of the job desiring nondisclosure of the "Bcc" destination, will be disclosed to the authenticated user and information security will be compromised.

On the other hand, if the selected destination is not included only as a "Bcc" destination, in the piece of job history information that has been obtained (NO in step S23), the controller 4 determines whether or not the authenticated user is included in one or more destinations (in other words, in the field of "To", "Cc", or "Bcc") indicated in the piece of job history information that has been obtained (step S7). If the authenticated user is not included in one or more destinations indicated in the piece of job history information that has been obtained (NO in step S7), the procedure proceeds to step S6. On the other hand, if the authenticated user is included in one or more destinations indicated in the piece of job history information that has been obtained (YES in step S7), the controller 4 removes a "Bcc" destination from the piece of job history information that has been obtained (step S8) and the procedure proceeds to step S5. This processing is performed because, if a "Bcc" destination is not removed, a "Bcc" destination, a sender of the job desiring nondisclosure of the "Bcc" destination, will be disclosed to any recipient of the job and information security will be compromised. In other words, step S8 is performed in order for a "Bcc" destination not to be disclosed to the authenticated user who is merely one of the recipients of the job.

Next, if the next piece of job history information is not present in the job history memory 7B (NO in step S6), the controller 4 lists and displays one or more pieces of job history information that have been added to the table for list display, on the operation display 2 (step S9).

For example, it is assumed that an authenticated user is "Kurihara", a destination selected from the destination list is "Shirakawa", and there are five pieces of job history information as illustrated in FIG. 2. In the first piece of job history information in FIG. 2, "Shirakawa" is included as a "To" destination but "Kurihara" is not included in the destinations. Therefore, the first piece of job history information is not added to a table for list display. In the second piece of job history information in FIG. 2, "Shirakawa", which is a selected destination, is included as a "Bcc" destination and "Kurihara" is a sender indicated in this piece of job history information. Therefore, the second piece of job history information is added to the table for list display. In the third piece of job history information in FIG. 2, "Shirakawa", which is a selected destination, is not included in this piece of job history information. Therefore, the third piece of job history information is not added to the table for list display. In the fourth piece of job history information in FIG. 2, "Shirakawa", which is a selected destination, is included as a "Cc" destination but "Kurihara" is not included in the destinations. Therefore, the fourth piece of job history information is not added to the table for list display. In the fifth piece of job history information in FIG. 2, "Shirakawa", which is a selected destination, is a sender indicated in this piece of job history information and "Kurihara" is included as a "Cc" destination. Therefore, the fifth piece of job history information is added to the table for list display. Note that, in the case where an authenticated user is a sender indicated in a piece of job history information, a "Bcc" destination is not removed from the piece of job history information because a security issue does not arise in this case. FIG. 12 illustrates an example of pieces of job history information listed and displayed in step S9 of FIG. 10.

The processing in steps S10 to S14 is similar to the processing in step S10 to S14 in FIG. 3 and therefore a description thereof will be omitted.

As described above, in the processing illustrated in FIG. 10, as a key used to search for a piece of job history information, a selected destination is set in addition to an authenticated user. In other words, a destination of data is set by using a piece of job history information in which an authenticated user and a selected destination are indicated. This may facilitate selection of a destination that meets a user's desire. Note that the number of destinations selected as a key used to search for a piece of job history information is not limited to one and may be more than one.

Figure 13:
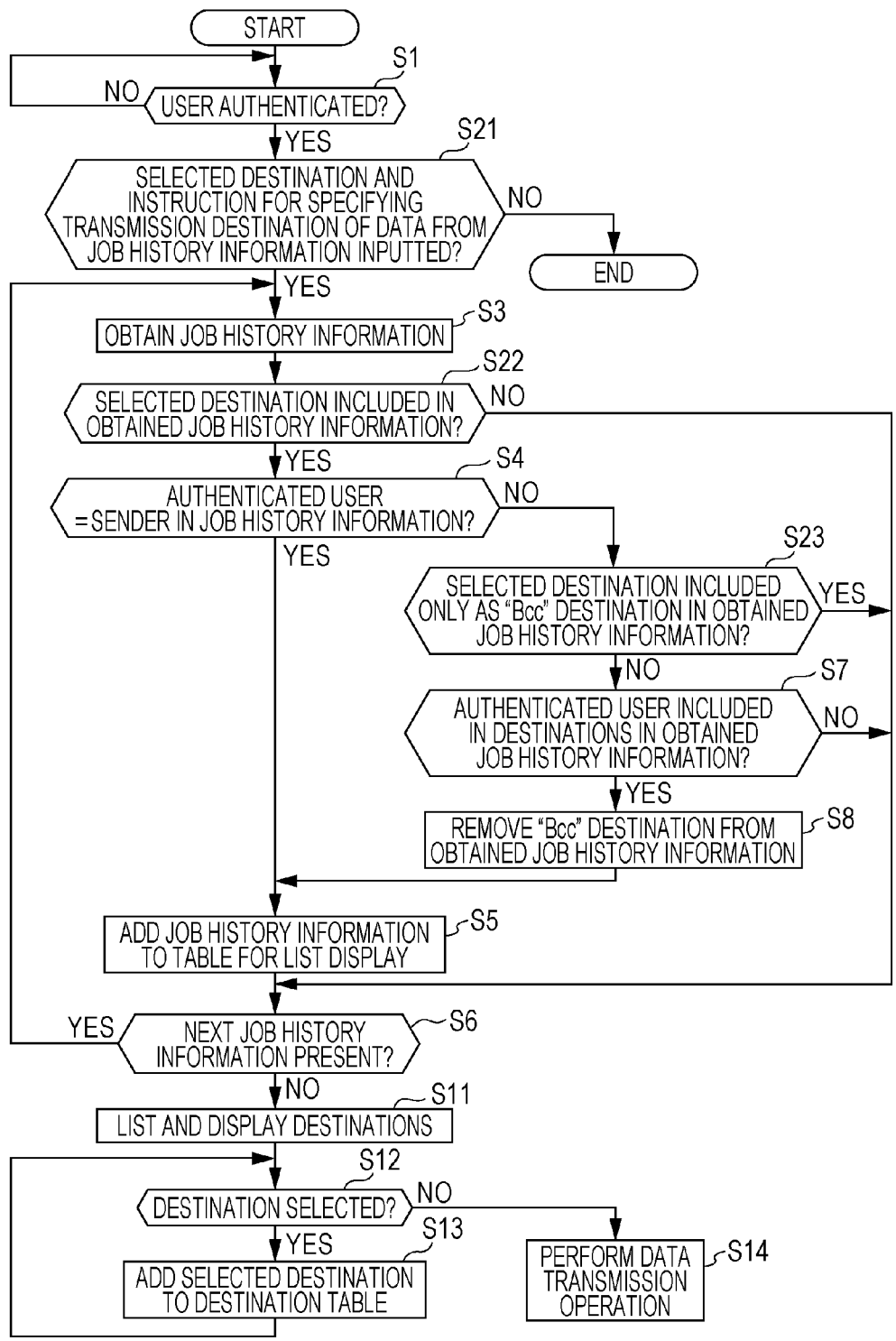
FIG. 13 is a flowchart illustrating a third modification of processing of setting one or more destinations of data by using one or more pieces of job history information.

FIG. 13 is a flowchart illustrating a third modification of processing of setting one or more destinations of data by using one or more pieces of job history information. In the flowchart illustrated in FIG. 13, steps S9 and S10 in FIG. 10 are omitted. In other words, in FIG. 13, the controller 4 does not list and display pieces of job history information that have been added to a table for list display but lists and displays one or more destinations included in pieces of job history information that have been added to a table for list display, on the operation display 2. Accordingly, with the processing illustrated in FIG. 13, processing time may be reduced compared with the processing illustrated in FIG. 10. FIG. 14 illustrates an example in which destinations included in pieces of job history information that have been added to a table for list display are listed and displayed on the operation display 2. In FIG. 13, if a destination has not been selected from among one or more destinations that have been listed and displayed, in other words, if destination selection has been completed (NO in step S12), a data transmission operation is performed (step S14).

As described above, according to the exemplary embodiments, the controller 4 performs user authentication and the storage 5 retains, for each job, a piece of job history information that includes information regarding a sender of a past job and "To", "Cc", "Bcc", and "Fax" destinations. To the operation display 2, an instruction for specifying a destination of data from one or more pieces of job history information is inputted and the controller 4 extracts one or more pieces of job history information in each of which an authenticated user is indicated as any one of a sender of a past job, a "To" destination, a "Cc" destination, a "Bcc" destination, and a "Fax" destination. The operation display 2 lists and displays all destinations included in one or more pieces of job history information that have been extracted and the controller 4 sets a destination that has been selected by a user from among destinations listed and displayed, as a destination of data. Note that, in FIGS. 2, 5 to 7, 9, 11A, 11B, 12, and 14, "To", "Cc", and "Bcc" email addresses and "Fax" facsimile numbers are used as destinations, however, a path that indicates a folder in the storage 5, a path that indicates an external server or an external storage, or an IP address that indicates an external server or an external storage may be included as a destination.

Accordingly, in the case where a destination of data is set, only one or more pieces of job history information relating to an authenticated user are referred to and therefore compromise of data security may be suppressed. Furthermore, a desired destination or a desired group does not have to be registered in advance as in an existing image forming apparatus and a transmission limitation setting as to whether or not facsimile or email transmission is allowed does not have to be made in advance. Therefore, a destination specification operation may be simplified.

An effect similar to that of the foregoing exemplary embodiments is achieved when a recording medium, in which a software program for implementing the function of the communication apparatus 1 is recorded, is provided to the communication apparatus 1 and the controller 4 reads and executes the program stored in the recording medium. Examples of a recording medium used to provide a program includes a compact disc read-only memory (CD-ROM), a digital versatile disc (DVD), and a Secure Digital (SD) card. Furthermore, an effect similar to that of the foregoing exemplary embodiments is also achieved when the controller 4 executes a software program for implementing the function of the communication apparatus 1.

Note that an exemplary embodiment of the present invention is not limited to the foregoing exemplary embodiments and may be modified in various forms without departing from the spirit thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
   a storage that retains one or more pieces of job history information, each piece of job history information including information regarding a sender of a past job and at least one destination;
   an operation display to which an instruction for specifying a destination from the one or more pieces of job history information is inputted;
   a controller that
      authenticates a user,
      extracts, in a first extraction, in a case where the instruction for specifying a destination from the one or more pieces of job history information has been inputted, one or more pieces of job history information in each of which the authenticated user is indicated as the sender; and
      extracts, in a second extraction, in a case where the instruction for specifying a destination from the one or more pieces of job history information has been inputted, one or more pieces of job history information in each of which the authenticated user is indicated as the destination; and
   a display that lists and displays destinations included in the one or more pieces of job history information that have been extracted by the first and second extractions,
   wherein the controller
   sets a destination that has been selected by the user from among the destinations that have been listed and displayed, as the destination of data, and
   wherein the controller removes, in a case where the authenticated user is not a sender indicated in a piece of job history information, a "Bcc" destination in the piece of job history information that has been extracted.

2. The communication apparatus according to claim 1, wherein
   the display lists and displays the one or more pieces of job history information that have been extracted and lists and displays destinations included in a piece of job history information that has been selected from among the one or more pieces of job history information that have been listed and displayed.

3. The communication apparatus according to claim 1, wherein
   in a case where a destination selected by the authenticated user and the instruction for specifying a destination of data from the one or more pieces of job history information have been inputted, the controller extracts one or more pieces of job history information in each of which the user is indicated as one of the sender and the destination, and the selected destination is included as a destination among destinations including "To" and "Cc" email addresses, a "Fax" facsimile number, path information indicating a folder in a storage, path information indicating a folder in an external apparatus, and an address indicating the external apparatus.

4. The communication apparatus according to claim 2, wherein
   in a case where a destination selected by the authenticated user and the instruction for specifying a destination of data from the one or more pieces of job history information have been inputted, the controller extracts one or more pieces of job history information in each of which the user is indicated as either one of the sender and the destination, and the selected destination is included as a destination among destinations including "To" and "Cc" email addresses, a "Fax" facsimile number, path information indicating a folder in a storage, path information indicating a folder in an external apparatus, and an address indicating the external apparatus.

5. A communication method comprising:

authenticating a user;

retaining one or more pieces of job history information, each of the one or more pieces of job history information including information regarding a sender of a past job and at least one destination;

inputting an instruction for specifying a destination from the one or more pieces of job history information;

extracting, as a first extraction, in a case where the instruction for specifying a destination from the one or more pieces of job history information has been inputted, one or more pieces of job history information in each of which the authenticated user is indicated as the sender;

extracting, as a second extraction, in a case where the instruction for specifying a destination from the one or more pieces of job history information has been inputted, one or more pieces of job history information in each of which the authenticated user is indicated as the destination;

listing and displaying destinations included in the one or more pieces of job history information that have been extracted in the first and second extractions; and setting a destination that has been selected by the authenticated user from among the destinations that have been listed and displayed, as the destination of data, wherein the method further comprises removing, in a case where the authenticated user is not a sender indicated in a piece of job history information, a "Bcc" destination in the piece of job history information that has been extracted.

6. A non-transitory computer readable medium storing a program causing a computer to execute a process for communication, the process comprising:

authenticating a user;

retaining one or more pieces of job history information, each of the one or more pieces of job history information including information regarding a sender of a past job and at least one destination;

inputting an instruction for specifying a destination from the one or more pieces of job history information;

extracting, as a first extraction, in a case where the instruction for specifying a destination from the one or more pieces of job history information has been inputted, one or more pieces of job history information in each of which the authenticated user is indicated as the sender;

extracting, as a second extraction, in a case where the instruction for specifying a destination from the one or more pieces of job history information has been inputted, one or more pieces of job history information in each of which the authenticated user is indicated as the destination;

listing and displaying destinations included in the one or more pieces of job history information that have been extracted in the first and second extractions; and setting a destination that has been selected by the user from among the destinations that have been listed and displayed, as the destination of data, wherein the process further comprises removing, in a case where the authenticated user is not a sender indicated in a piece of job history information, a "Bcc" destination in the piece of job history information that has been extracted.

7. The communication apparatus according to claim 1, wherein the at least one destination comprises a "To", "Cc", or "Bcc" email address, a "Fax" facsimile number, path information indicating a folder in a storage, path information indicating a folder in an external apparatus, or an address indicating the external apparatus.

8. The communication method according to claim 5, wherein the at least one destination comprises a "To", "Cc", or "Bcc" email address, a "Fax" facsimile number, path information indicating a folder in a storage, path information indicating a folder in an external apparatus, or an address indicating the external apparatus.

9. The computer readable medium according to claim 6, wherein the at least one destination comprises a "To", "Cc", or "Bcc" email address, a "Fax" facsimile number, path information indicating a folder in a storage, path information indicating a folder in an external apparatus, or an address indicating the external apparatus.

* * * * *